(12) United States Patent
Beesley

(10) Patent No.: US 7,040,053 B1
(45) Date of Patent: May 9, 2006

(54) TIERED PLANTER FOR USE WITH POSTS

(76) Inventor: Brian Charles Beesley, 1852 Hilmerton Cir., Roseville, CA (US) 95747

( * ) Notice: Subject to any disclaimer, the term of this patent is extended or adjusted under 35 U.S.C. 154(b) by 0 days.

(21) Appl. No.: 10/968,666

(22) Filed: Oct. 18, 2004

(51) Int. Cl.
*A47G 7/00* (2006.01)
(52) U.S. Cl. ......................................... 47/39
(58) Field of Classification Search ............. 47/83, 47/86, 39, 82, 41.01, 67, 66.6, 65.5; 211/205, 211/85.23, 107; 248/161, 405, 59, 218.4, 248/230.1, 307, 309.1
See application file for complete search history.

(56) References Cited

U.S. PATENT DOCUMENTS

| | | | | |
|---|---|---|---|---|
| 47,664 A | * | 5/1865 | Sheldon | 211/77 |
| 284,090 A | * | 8/1883 | Tingle | 211/75 |
| 3,888,354 A | * | 6/1975 | Margolin et al. | 211/110 |
| 4,962,614 A | * | 10/1990 | Koerper | 47/66.1 |
| 5,983,566 A | * | 11/1999 | Enderlein et al. | 47/73 |

* cited by examiner

*Primary Examiner*—T. Nguyen
(74) *Attorney, Agent, or Firm*—Risto A. Rinne, Jr.

(57) ABSTRACT

An apparatus for use with posts includes a base section that is adapted to be placed on the ground and around a post. A plurality of stackable members are placed on top of the base section or on top of other stackable members. Each stackable member preferably includes a method of engaging mechanically with another stackable member or with the base section that is disposed below it sufficient to maintain a radial position relative to the stackable member or base section that is disposed below it. A plant support member that is adapted to receive a plant, a shrub, or a pot therein is attached to an arm which is attached to the stackable member or base section. Each of the plant support members is disposed at a different elevation and at a preferred radial position with respect to a plant support member that is disposed above or below it.

13 Claims, 2 Drawing Sheets

TIERED PLANTER FOR USE WITH POSTS

BACKGROUND OF THE INVENTION

1. Field of the Invention

The present invention, in general, relates to pots for holding plants and, more particularly, to a tiered planter for use around posts.

People like to place ornamental shrubs and plants in pots of all sizes and shapes. Shrubs and plants provide an improved aesthetic appearance wherever they are located.

Posts that are either round or square are used on decks, fences, awnings, carports, and for numerous other purposes. While planters that split in two can accommodate a post, they do not provide an ability to display plants up along the height of the post.

It is desirable to be able to use the height of the post to display shrubs and plants and also to be able to offset the shrubs and plants as desired as they occur along the height of the post. For example, it is desirable to locate certain plants so that they extend away from the post in a particular direction, perhaps in a direction that does not impede a foot path at a lower elevation and to locate higher plants so that they extend away from the post in a different direction.

It may be desirable to orient a plant or shrub at any particular elevation so that it extends away from the post in different direction than does another plant or shrub that is disposed above or below it. This need may occur for a variety of reasons including, for example, a need to dispose the plant or shrub with a particular direction offset from the post based upon the size and overall shape of the plant or shrub.

It is also desirable to be able to add new plants and plant holders above (or below) existing ones from time to time, as well to accommodate other changing needs.

Accordingly, there exists today a need for a tiered planter for use with posts that helps ameliorate the above mentioned difficulties.

Clearly, such an apparatus would be useful and desirable.

2. Description of Prior Art

Pot holders for plants are, in general, known. For example, the following patents describe various types of these devices:

U.S. Pat. No. 6,381,902 to Batshon, May 7, 2002;
U.S. Pat. No. 6,044,585 to Carruth et al., Apr. 4, 2000;
U.S. Pat. No. 5,960,687 to Brasseur, Jr., et al., Oct. 5, 1999;
U.S. Pat. No. 5,934,014 to Carrothers, Aug. 10, 1999;
U.S. Pat. No. 5,178,286 to Allison, III, Jan. 12, 1993;
U.S. Pat. No. 4,847,741 to Boettinger, Jul. 11, 1989;
U.S. Pat. No. 4,216,622 to Hollenbach et al., Aug. 12, 1980;
U.S. Pat. No. 4,083,457 to Dromboski, Apr. 11, 1978;
U.S. Pat. No. 3,747,268 to Linder, Jul. 24, 1973;
U.S. Pat. No. 1,683,271 to Thompson et al., Sep. 4, 1928;
U.S. Pat. No. 1,499,473 to Price, Jul. 1, 1924;
U.S. Pat. No. 317,443 to Cunningham, May 5, 1885;
U.S. Pat. No. 284,090 to Tingle, Aug. 28, 1883;
U.S. Pat. No. 214,061 to Stearns, Apr. 8, 1879;
U.S. Pat. No. 113,035 to Erkson, Mar. 28, 1871;
U.S. Pat. No. 47,664 to Sheldon, May 9, 1865;
U.S. Pat. No. 37,070 to Crawford, Dec. 2, 1862; and
Design patents 480,986, 435, 177, 405, 027, 383, 417, 377, 874, 278, 521, 250, 372, 247, 937, 244,971, and 60,175.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a tiered planter for use with posts that is adapted for use with round posts.

It is also an important object of the invention to provide a tiered planter for use with posts that is adapted for use with square posts.

Another object of the invention is to provide a tiered planter for use with posts that is adapted for use with rectangular posts.

Still another object of the invention is to provide a tiered planter for use with posts that can support plants at different heights.

Still yet another object of the invention is to provide a tiered planter for use with posts that includes a method of stacking one plant supporting device on top of another.

Yet another important object of the invention is to provide a tiered planter for use with posts that includes a method of stacking one plant supporting device on top of another and of securing the relative position between the two devices.

Still yet another important object of the invention is to provide a tiered planter for use with posts that includes a method of stacking one plant supporting device on top of another and of securing the relative position radially between the two devices.

A first continuing object of the invention is to provide a tiered planter for use with posts that permits other sections to be added as desired.

A second continuing object of the invention is to provide a tiered planter for use with posts that includes a plant supporting device that is offset away from the post.

Briefly, a tiered planter for use with posts that is constructed in accordance with the principles of the present invention has a base section that is adapted to be disposed on the ground and around a post. A plurality of stackable members are each adapted to be placed on top of the base section or also on top of other stackable members, one of which alternately, could instead be used as the base section. Each stackable member preferably includes a method of engaging mechanically with another stackable member or base section that is disposed below it sufficient to maintain a radial position relative to the unit that is disposed below it. A plant support member that is adapted to receive a plant or a pot therein is attached to the stackable member and includes a longitudinal length that extends away from the post a predetermined distance.

DETAILED DESCRIPTION OF THE INVENTION

Figure 1:
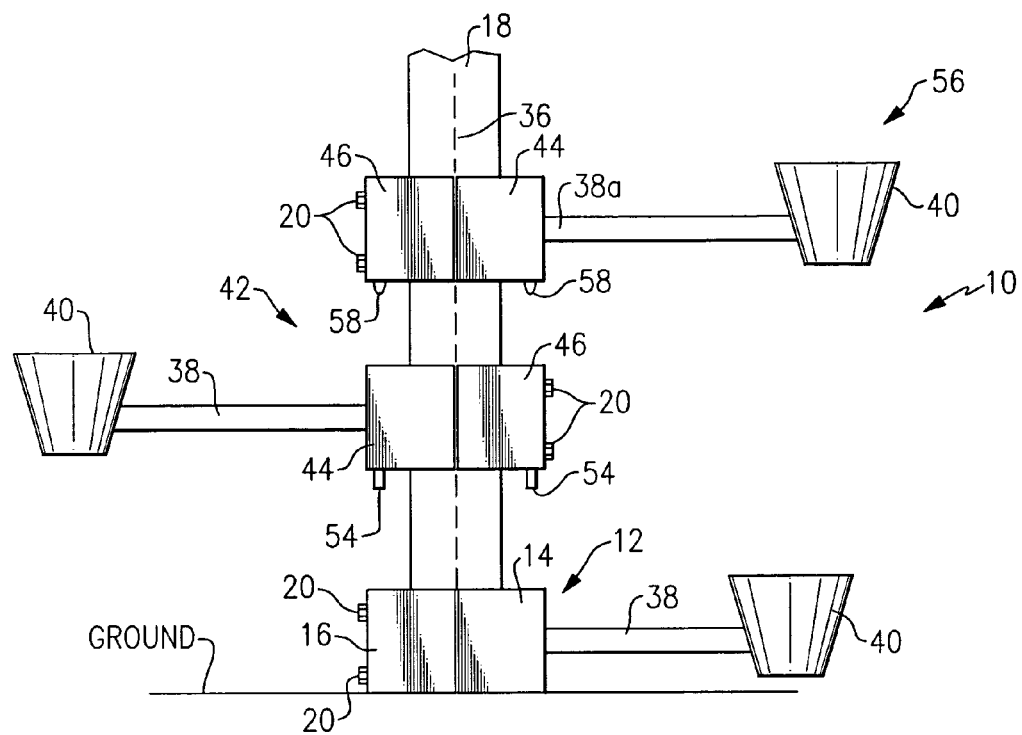
FIG. 1 is a side view of a tiered planter for use with posts.

Referring on occasion to all of the drawings and in particular now to FIG. 1 is shown, a tiered planter for use with posts, identified in general by the reference numeral 10.

A base section, identified in general by the reference numeral 12, is disposed on the ground. The base section 12 includes a first half 14 and a second half 16 that are secured together around a post 18 by a pair of bolts 20.

Figure 3:
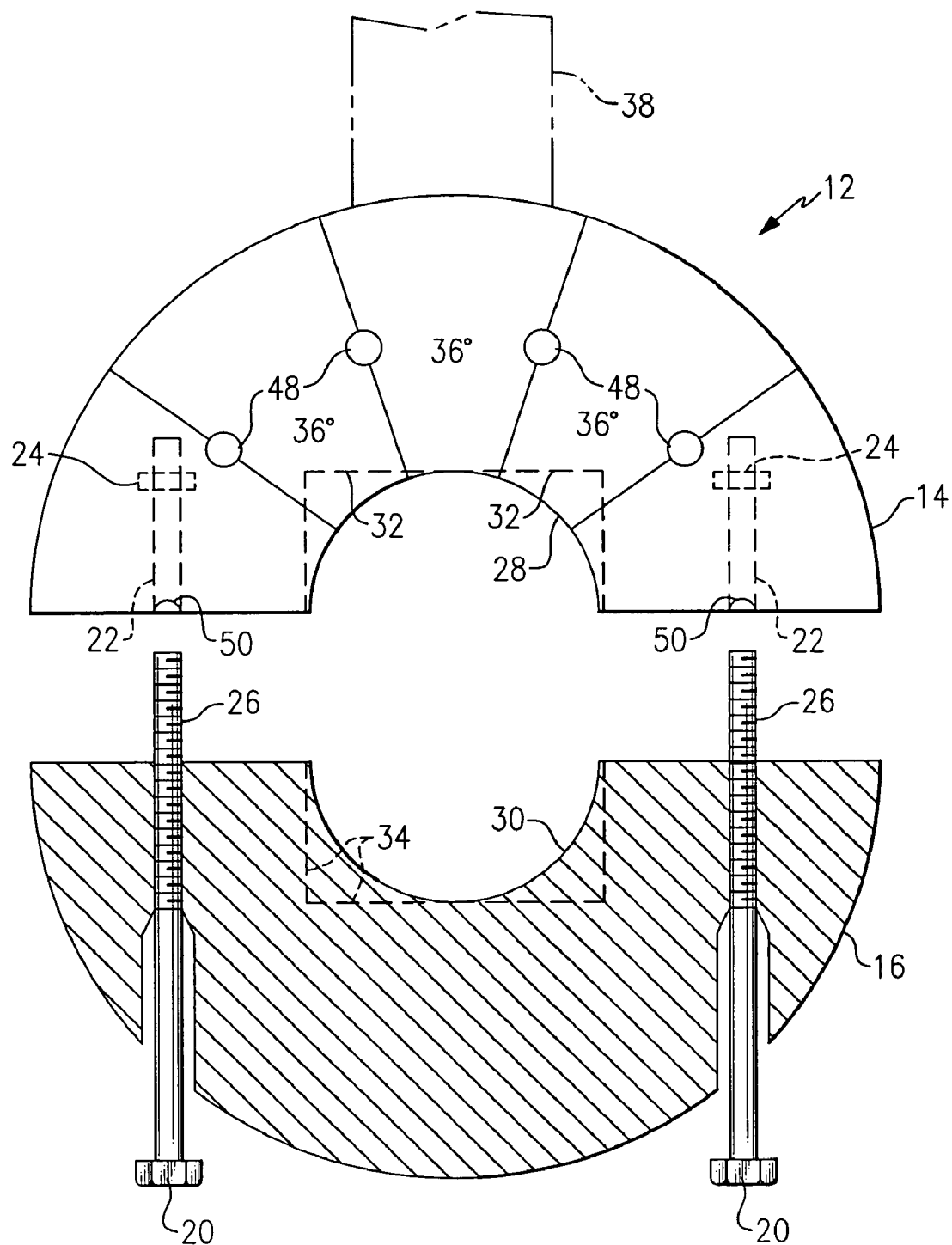
FIG. 3 includes, on one half of the drawing, a top view of a base section and, on a remaining half of the drawing, a cross-sectional view of a remainder of the base section is shown.

Referring also to FIG. 3, the bolts 20 pass through the second half 16 and enters into openings 22 in the first half 14. A nut 24 is provided in each opening 22 to engage with threads 26 on the bolts 20 and therefore to urge the first and second sections 14, 16 together around the post 18 when the bolts 20 are tightened.

It is understood that many modifications, not mentioned herein, are of course possible. For example if desired, the nuts 24 could be eliminated and modified threads (not shown) could be included as a part of the openings 22 themselves.

A first half of an opening 28 is provided proximate a center of the first half 14 and a second half of an opening 30 is provided proximate a center of the second half 16.

When the first and second halves 14, 16 are urged together the first half of an opening 28 and the second half of an opening 30 combine to form a circle. This is useful when the post 18 includes a round cross-section.

A first dashed line 32 and a second dashed line 34 show an alternate shape for a modified center opening. The modified center opening is useful when the post 18 includes a square or rectangular cross-section.

When either a square or rectangular cross-section is used for the post 18 along with the modified center opening, the base section 12, after it is tightened around the post 18, is prevented from rotating radially around a longitudinal axis 36 of the post 18. This is useful because it prevents any plants or shrubs from inadvertently changing their position radially around the post 18, for example, if they are bumped by people walking by.

An arm 38 is attached at a first end thereof to the base section 12 and at an opposite second end thereof to a plant supporting device 40. The plant supporting device 40 includes a flower pot or a surrounding structure that is adapted to receive a flower pot therein.

The arm 38 and the plant supporting device 40 may be eliminated from the base section 12, as desired. This is useful if it is undesirable to include a plant or shrub at ground level. Elimination of the arm 38 and the plant supporting device 40 from the base section 12 provides elevation above ground level to any plant or shrub that is supported by the tiered planter for use with posts 10, as is described in greater detail hereinafter.

A stackable member, identified in general by the reference numeral 42 is disposed above the base section 12. The stackable member 42 includes a modified first half 44 and a modified second half 46 that are similarly secured together around the post 18 by two more of the bolts 20.

The stackable member 42 also includes the arm 38 and the plant supporting device 40, as desired.

The arm 38 and the plant supporting device 40 can also be eliminated from any of the stackable members 42, if preferred. This allows creating a variable height offset between stackable members 42 that are able to support a shrub or plant (i.e., those which do contain the arm 38 and the plant supporting device 40).

The top of the first half 14 and the second half 16 of the base section 12 each contain a plurality of recesses 48 that are disposed radially around the longitudinal axis 36. The recesses 48 are preferably offset radially approximately 36 degrees from each other and are equidistant from the longitudinal axis 36. A half recess 50 appears at each end of the first half 14 of the base section 12 and cooperates with another half recess 50 in the remaining second half 16.

The top of each stackable member 42 also includes the same arrangement of recesses 48 and half recesses 50.

A bottom of each stackable member 42 includes at least one protrusion 54 that resembles a cylinder in shape and which is adapted to enter into one of the recesses 48 (or pairs of half recesses 50) sufficient to secure the stackable member 42 relative to the base member 12 that is disposed immediately below it.

A plurality of the protrusions 54 can be used, however at least one protrusion 54 that cooperates with at least one recess 48, 50 is required to prevent the stackable member 42 from rotating around the post 18 (i.e., around the longitudinal axis 36) relative to the base member 12.

A second modified stackable member 56 is disposed above the stackable member 42. The modified stackable member 56 is identical to the stackable member 42 except that the modified stackable member 56 includes a modified arm 38a and a plurality of modified protrusions 58 (instead of the protrusions 54). The modified protrusions 58 resemble hemispheres and they are also adapted to enter into and cooperate with the recesses 48, 50.

The modified stackable member 56, as shown, is placed on top of the stackable member 42, which is placed on top of the base section 12. The protrusions 54 and modified protrusions 58 engage with recesses 48, 50 sufficient to prevent rotation of the modified stackable member 56 and the stackable member 42 relative to the base section 12.

The plant supporting devices 40 can be offset radially around the post 18 as desired. They can be diametrically opposed, on top of one-another, or arranged in a spiral tier pattern, as desired.

Additional stackable members 42 (or modified stackable members 56) can be added as desired. Any of the stackable members 42 (or modified stackable members 56) can also be removed, as desired.

The modified arm 38a includes a different length than the arm 38 and is used to provide a different offset for the plant supporting device 40 from the post 18. This allows great versatility in displaying different types of plants and shrubs in optimum ways, some close to the post 18, some further away from the post 18.

Figure 2:
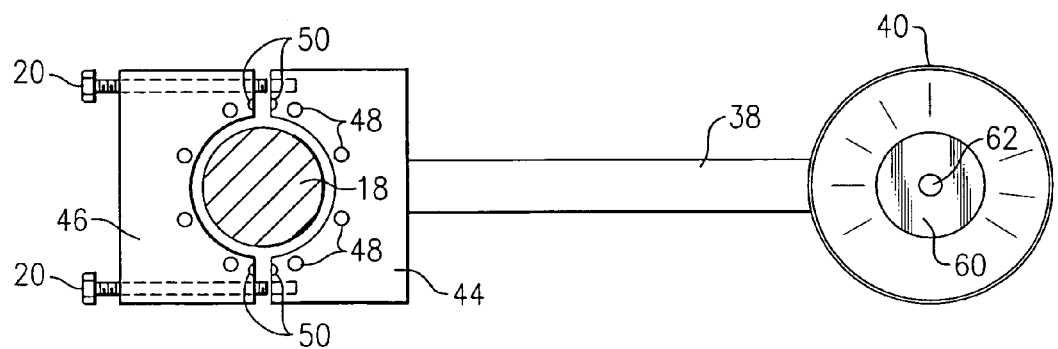
FIG. 2 is a top view of a stackable member of the tiered planter of FIG. 1.

Referring now to FIG. 2, the plant supporting device 40 can be modified to include a bottom member 60. The bottom member 60 includes a drainage hole 62, as desired. The bottom member 60 and the drainage hole 62, along with a remainder of the plant supporting device 40, combine to provide a pot that is disposed at the second end of the arm 38.

Plants or shrubs (not shown) can be placed directly in the plant supporting device 40 or, if preferred, the plants and shrubs can be placed in an individual pot (not shown) that is then placed in the plant supporting device 40.

Referring again momentarily to FIG. 1, the arm 38, as shown, includes arm threads 64 that engage with threads provided in the modified first half 44. Accordingly, the arm 38 and the plant supporting device 40 can be removed apart from the stackable member 42 or added to it, as desired.

If the arm 38 and the plant supporting device 40 are removed from every other stackable member 42, a greater vertical spacing is provided between a lower and an upper plant supporting device 40 to provide any desired appearance to the tired planter for use with posts 10.

If desired, the base section 12 can be eliminated and the stackable member 42 or the modified stackable member 56 placed directly on the ground.

It is also possible to include any angular offset for the arm 38 or modified arm 38a so that it is not parallel with respect to the ground. Also, any ornamental shape, including curves, can be included as part of the base section 12, stackable members 42, modified stackable members 56, or arms 38, 38a, as desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A tiered planter for use with posts, comprising:
   (a) means for securing a first member around a post;
   (b) means for attaching a first plant supporting device to said first member, said first plant supporting device disposed a predetermined distance away from said post;
   (c) means for securing a second member around a post;
   (b) means for attaching a second plant supporting device to said second member, said second plant supporting device disposed a predetermined distance away from said post; and
   including means for securing said second member to said first member sufficient to prevent radial movement of said second member around a longitudinal axis of said post with respect to said first member and sufficient to prevent radial movement of said second member or said first member with respect to said post.

2. A tiered planter for use with posts, comprising:
   (a) means for securing a member around a post at a first elevation;
   (d) means for securing a second member around a post at a second elevation, wherein said second elevation is disposed above said first elevation;
   (f) means for attaching a plant supporting device to said member or to said second member; and
   including means for securing said second member to said member sufficient to prevent radial movement of said second member around a longitudinal axis of said post with respect to said member and sufficient to prevent radial movement of said second member or said member with respect to said post.

3. A tiered planter for use with posts, comprising:
   (a) means for securing a first member around a post at a first elevation;
   (b) an arm having a first end and an opposite second end, said first end attached to said first member;
   (c) means for attaching a first plant supporting device to said second end of said arm;
   (d) means for securing a second member around a post at a second elevation, wherein said second elevation is disposed above said first elevation;
   (e) a modified arm having a first end and an opposite second end, said first end attached to said second member;
   (f) means for attaching a second plant supporting device to said second end of said modified arm; and
   (g) including means for securing said second member to said first member sufficient to prevent radial movement of said second member around said a longitudinal axis of said post with respect to said first member and sufficient to prevent radial movement of said second member or said first member with respect to said post.

4. The tiered planter of claim 3 wherein said means for securing a member around a post includes a first half of said member and a second half of said member and wherein said first half is detachably-attachable with respect to said second half.

5. The tiered planter of claim 4 including said means for securing a member around a post includes at least one bolt.

6. The tiered planter of claim 3 wherein said means for securing a second member around a post includes a first half of said second member and a second half of said second member and wherein said first half is detachably-attachable with respect to said second half.

7. The tiered planter of claim 3 wherein said means for securing said second member to said first member included providing at least one recess in a top surface of said first member and at least one protrusion in a bottom surface of said second member, and wherein said at least one protrusion is adapted to cooperate with said at least one recess.

8. The tiered planter of claim 7 wherein said protrusion includes a cylindrical shape.

9. The tiered planter of claim 7 wherein said protrusion includes a hemispherical shape.

10. The tiered planter of claim 3 wherein said modified arm includes a longitudinal length that is different than a longitudinal length of said arm.

11. The tiered planter of claim 3 wherein said plant supporting device includes a pot.

12. The tiered planter of claim 11 wherein said pot includes a drainage hole.

13. The tiered planter of claim 3 wherein said plant supporting device includes means for receiving a pot therein.

* * * * *